May 6, 1924.

W. M. REASON

AUTOMOBILE STOP SIGNAL 1,493,385

Filed July 3, 1922

INVENTOR.
Walter M. Reason.

BY

ATTORNEY.

Patented May 6, 1924.

1,493,385

UNITED STATES PATENT OFFICE.

WALTER M. REASON, OF PONTIAC, MICHIGAN.

AUTOMOBILE STOP SIGNAL.

Application filed July 3, 1922. Serial No. 572,544.

*To all whom it may concern:*

Be it known that I, WALTER M. REASON, a citizen of the United States, residing at Pontiac, county of Oakland, State of Michigan, have invented a certain new and useful Improvement in Automobile Stop Signals, and declare the following to be a full, clear, and exact description of the same, such as will enable others skilled in the art to which it pertains to make and use the same, reference being had to the accompanying drawings, which form a part of this specification.

This invention relates to automobile stop signals and the object of the invention is to provide a stop signal for the rear of an automobile which is operated by a single electric light. Another object of the invention is to provide an automobile stop signal adapted to be used as an automobile tail light. A further object of the invention is to provide a red tail lamp adapted to be normally illuminated by the electric light, the casing for the tail lamp having an upper portion provided with a green light and a stop light, the electric light being vertically movable within the casing and adapted to be operated by the automobile brake pedal to illuminate the tail, green or stop lights. A further object of the invention is to provide a stop light comprising a movable electric lamp provided with a reflector adapted to shut off the light from all signal lenses except that directly in front of the lamp. A still further object of the invention is to provide a combination tail lamp and stop light including a vertically movable electric light adapted upon movement to illuminate the different signals separately, the device normally illuminating the tail lamp only. These objects and the several novel features of the invention are hereinafter more fully described and claimed and the preferred form of construction by which these objects are attained is shown in the accompanying drawings in which—

Figure 1:
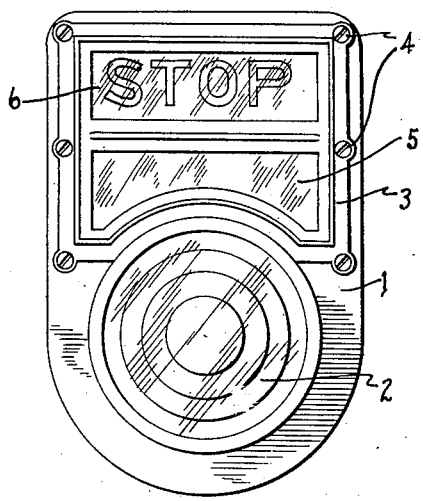
Fig. 1 is a face view of an automobile stop light embodying my invention.
Figure 2:
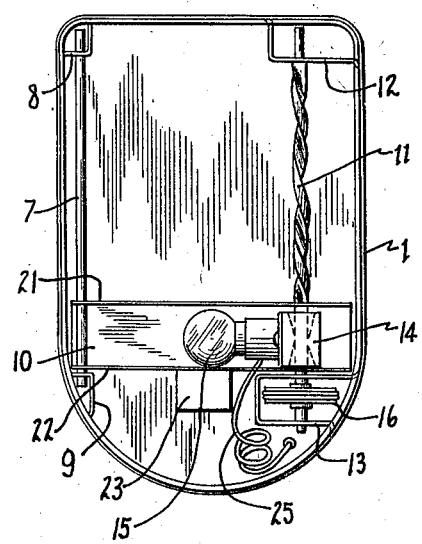
Fig. 2 is a similar view with the front of the casing removed.
Figure 3:
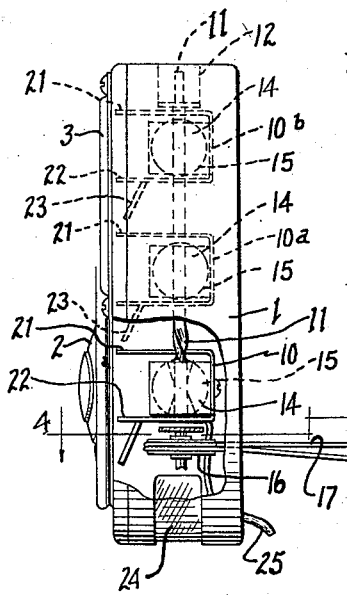
Fig. 3 is an edge view of the device with the casing partly broken away to show the construction.
Figure 4:
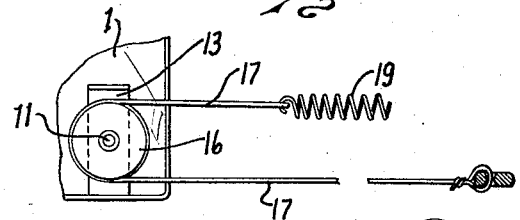
Fig. 4 is a section taken on line 4—4 of Fig. 3.
Figure 5:
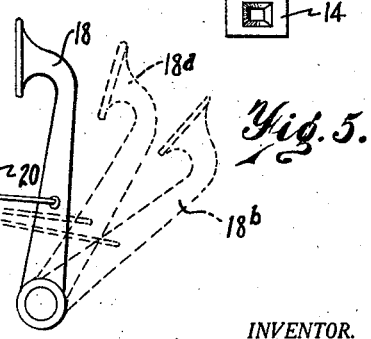
Fig. 5 is a plan view of the electric lamp and base.

As shown in Fig. 1 a casing 1 is provided having a red tail lamp lens 2 mounted in the lower end and the upper end of the casing is provided with an aperture over which a member 3 is secured by the screws 4. This member 3 carries a green lens 5 and a red lens 6 having the word "Stop" embossed therein. Within the casing, as shown in Fig. 2, is a guide rod 7 mounted in brackets 8 and 9 and a reflector 10 of U shaped form in cross section as shown in Fig. 3 is slidably mounted on the guide rod 7 as shown in Fig. 2. A rod 11 is provided in the casing which is square in cross section and is twisted to form a long spiral and this rod 11 is rotatably mounted in a bracket 12 at the upper end and a bracket 13 at the lower end. A nut 14 is provided on the twisted rod 11 and is secured to the reflector 10 to prevent rotation thereof and an incandescent electric light 15 is secured to one side of this nut as shown in Figs. 2 and 5. Within the bracket 13 on the lower end of the rod 11 is a pulley 16 adapted to be turned to rotate the rod 11 and as shown in Figs. 3 and 4 a cable 17 is connected to the automobile brake pedal 18 and is wound around the pulley 16, the opposite end of the cable being connected by means of a coiled spring 19 to a solid support 20. The reflector 10 which is polished on the inside is provided with outwardly extending flanges 21 and 22 positioned above and below the electric light 15 and a portion 23 is struck out of the flange 22 immediately beneath the electric light 15 to allow the light to shine through the opening thus provided and through the transparent member 24 onto the automobile license plate. The portion 23 which is polished on the inside acts as a reflector and deflects the light downwardly through the member 24 at the same time preventing the light from shining through the opening thus provided and illuminating any of the lenses beneath the flange 22 except the member 24. The electric lamp 15 as shown in Fig. 2 is connected by a two-wire conductor cord 25 to a suitable source of current supply which in most cases is the automobile storage battery.

In operation when the brake pedal is in the released position shown in full lines in Fig. 3 the light is also in the position shown in full lines in Figs. 2 and 3 at which time the light is reflected through the tail lamp lens 2 and through the transparent member 24 for illuminating the license plate. Should the brake pedal be depressed to the position shown at 18ª in Fig. 3 the cable 17 will be moved to rotate the pulley 16 and screw shaft 11 causing the nut 14 to travel up the screw shaft thus raising the reflector 10 and incandescent light to the position shown at 10ª in Fig. 3, at which time the green light 5 is illuminated and the depending portion 23 prevents the light from illuminating the tail lamp lens 2. In this position the light may shine downwardly through the aperture provided by the out-turned portion 23 and is also deflected from the portion 23 through the license illuminating member 24. Should the brake pedal be depressed to the position shown at 18ᵇ the movement of the cable 17 turns the pulley 16 thus rotating the rod 11 which raises the nut 14 thereon to the position 10ᵇ shown in dotted lines in Fig. 3 at which time the light is reflected through the stop light 6 and down through the member 24, the member 23 preventing the light from illuminating the green lens 5 or the tail lens 2. The movement of the cable caused by depression of the foot pedal 18 elongates the spring 19 and upon release the foot pedal returns to the position shown in full lines in Fig. 3 and the spring 19 contracts thus causing movement of the cable in the opposite direction which turns the pulley 16 and rod 11 to move the lamp and reflector back to the position shown in full lines in Fig. 3 at which time the light illuminates the lens 2 and lens 24 and the flange 21 prevent the light from illuminating the upper part of the casing. It can thus be seen that upon operation of the brake pedal, the lamp and deflector is moved accordingly to illuminate the corresponding signal and upon release of the brake pedal the lamp and reflector is returned to the original position. Instead of using the green lens 5 a red glass may be used having the word "Slow" embossed therein to provide an intermediate signal between the tail and stop lights. By this arrangement there is always a light at the rear of the automobile irrespective of the position of the electric lamp and reflector.

From the foregoing description it becomes evident that the device is very simple and efficient in operation, is of comparatively low manufacturing cost, will not easily get out of order, is very positive in action and provides a device which accomplishes the objects described.

Having thus fully described my invention, what I claim is—

1. An automobile signal comprising a casing having a series of signal lenses in alignment therein, a screw shaft rotatably mounted in one side of the casing, a nut for the screw shaft, a reflector secured to the said nut, a guide rod on the opposite side of the casing for the said reflector, an electric light mounted in the reflector, and means connecting the screw shaft with the brake pedal of an automobile whereby operation of the brake pedal rotates the shaft to move the nut, reflector and electric light to position behind any lens.

2. An automobile signal comprising a casing having a series of signal lenses in alignment therein, a screw shaft, a nut on the screw shaft, a reflector secured to the said nut, an electric light mounted in the reflector, and means for rotating the screw shaft to move the nut longitudinally thereof to position the reflector and light behind any lens.

3. An automobile signal comprising a casing having a series of signal lenses in alignment therein, a screw shaft, a reflector carried by the screw shaft, an electric light mounted in the reflector, and means for rotating the screw shaft to move the electric light and reflector to position behind any lens.

4. An automobile signal comprising a casing having a series of signal lenses in alignment therein, an electric light movably mounted in the casing, means for moving the electric light to position behind any lens, and means preventing the electric light from illuminating more than one lens at a time.

5. An automobile signal comprising a casing having a series of signal lenses in alignment therein, a reflector, an electric light mounted in the reflector, and means for moving the electric light and reflector to position behind any lens.

6. An automobile signal comprising a casing having a series of signal lenses in alignment therein, an electric light movably mounted in the casing, and means for moving the electric light to position behind any lens.

In testimony whereof, I sign this specification.

WALTER M. REASON